United States Patent
Curtis et al.

(10) Patent No.: US 9,421,470 B2
(45) Date of Patent: Aug. 23, 2016

(54) PLAYER MODEL

(71) Applicant: Google Inc., Mountain View, CA (US)

(72) Inventors: Duncan John Curtis, Castro Valley, CA (US); Alexander Ruben Stacey McCarthy, San Francisco, CA (US)

(73) Assignee: Google Inc., Mountain View, CA (US)

( * ) Notice: Subject to any disclaimer, the term of this patent is extended or adjusted under 35 U.S.C. 154(b) by 235 days.

(21) Appl. No.: 14/170,898

(22) Filed: Feb. 3, 2014

(65) Prior Publication Data
US 2015/0217198 A1 Aug. 6, 2015

(51) Int. Cl.
*G06F 17/00* (2006.01)
*A63F 13/67* (2014.01)
*A63F 13/52* (2014.01)
*A63F 13/2145* (2014.01)

(52) U.S. Cl.
CPC .............. *A63F 13/67* (2014.09); *A63F 13/52* (2014.09); *A63F 13/2145* (2014.09); *A63F 2300/209* (2013.01)

(58) Field of Classification Search
USPC ...................................... 463/30–33
See application file for complete search history.

(56) References Cited

U.S. PATENT DOCUMENTS

| 8,018,579 B1* | 9/2011 | Krah | G01B 11/00 356/4.01 |
| 2004/0027349 A1* | 2/2004 | Landau | G06F 17/30572 345/440 |
| 2013/0191242 A1* | 7/2013 | Daniel | G06Q 30/0631 705/26.7 |
| 2014/0204036 A1* | 7/2014 | Schillings | G06F 3/04883 345/173 |

OTHER PUBLICATIONS

Baumgarten, Robin et al.,"Case-Based Player Simulation for the Commercial Strategy Game Defcon", Available at http://www.doc.ic.ac.uk/~sgc/papers/baumgarten_cgames07.pdf, Dec. 13, 2013.
Johnson, Daniel et al.,"Computer Games with Intelligence", The 10th IEEE International Conference on Fuzzy Systems, Melbourne, Australia, pp. 1355-1358, Dec. 2001.
Lieberman, Henry et al.,"Agents for the User Interface", Available at http://web.media.mit.edu/~lieber/Publications/Publications.html, Dec. 13, 2013.
Limpaecher, Alex et al.,"Real-time Drawing Assistance through Crowdsourcing", Available at http://research.microsoft.com/en-us/um/people/cohen/drawafriend.pdf, Jan. 24, 2014.
Murphy VII Ph.D., Dr. Tom,"The First Level of Super Mario Bros. is Easy with Lexicographic Orderings and Time Travel . . . after that it gets a little tricky.", Available at http://www.cs.cmu.edu/~tom7/mario/mario.pdf, Jan. 24, 2014.
Patel, Ushma K. et al.,"Improving Behavior of Computer Game Bots Using Fictitious Play", International Journal of Automation and Computing, pp. 122-134, Apr. 2012.

* cited by examiner

*Primary Examiner* — Ronald Laneau
(74) *Attorney, Agent, or Firm* — Morris & Kamlay LLP

(57) ABSTRACT

A player model for a video game is generated based on inputs received from users who have played past versions of the game. The player model can be used to simulate user actions in a new version of the video game and make predictions about average user session length, average earnings per session, number of games played per day, etc. More than one player model may be generated for a game. Each player model for a game may represent one or more features, such as a user skill level, for a group of users.

20 Claims, 5 Drawing Sheets

User inputs
510

Player model
simulations
520

PLAYER MODEL

BACKGROUND

Video game applications traditionally undergo a variety of testing to determine whether the game is functional (e.g., substantially free of bugs) and/or entertaining. Software such as a game may undergo various stages of release, both internally and externally, such as an alpha and beta release. Beta testing may refer to a limited release to external users. The users may report back to the maker of the software any bugs that are discovered and/or provide feedback on the quality of various aspects of the software. The software maker may fix the bugs and/or alter functionality of the software to emphasize those features which testers felt were successful. This process can be time consuming and may not be predictive about the quality of the software.

In game development in particular, quality assurance can be difficult because users may play the game in ways that are unexpected or difficult to predict. Unexpected behavior may, therefore, make use of standard software engineering techniques less reliable. One way game developers attempt to test a game application is by engaging a quality assurance company that may test the software. Another option employed by game developers is fuzz testing, where random inputs are generated in the hope that the inputs will test portions of the software that human testers may not stumble upon. Another option is to write a custom artificial intelligence ("AI") for the game (e.g., a bot). The AI may have coverage issues, however, because it will only find portions of the game that it has been coded to find or test.

BRIEF SUMMARY

According to an implementation of the disclosed subject matter, one or more inputs from one or more users of an application may be obtained. A first set of draw signals for the application may be obtained. Correlations may be determined between at least a portion of the first set of draw signals for the application with at least a portion of the inputs from the one or more users of the application. At least one computer-implemented player model may be generated based on the correlations.

In an implementation, a system is provided that includes a database and a processor connected thereto. The database may store one or more inputs from users of an application. The processor may be configured to obtain the inputs from the users of the application and obtain a first set of draw signals for the application. It may determine correlations between at least a portion of the first set of draw signals for the applications with at least a portion of the inputs from the users of the application. The processor may be configured to generate at least one computer-implemented player model based on the correlations.

The implementations disclosed herein disclose generation of a computer-implemented player model that may provide feedback to developers in the form of a prediction of how the developer's game is likely to be received by users. Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

In an implementation a method of generating a player model for a video game is disclosed. The player model may be a computer-generated player that behaves similar to a group of users based on a variety of signals that indicate the group of users' behavior. The developer for the game may be one source of signals and other signals may be captured from a device on which a user plays the game (e.g., touch input, key strokes, actions a user takes, etc.) and/or a wireless device input. Other signals may obtained from system data such as the time of day, other application notifications (e.g., was a user pulled out of a game for some other reason), location, movement, etc.

A machine learning technique may be applied to the received signals to build a predictive model of what a group of users (e.g., players) will do in the game at any given time. Multiple player models may be generated for each game and each player model may be representative of a group of users who play the game. For example, player models may define groups of users based on demographics or different behaviors (e.g., user skill level, user speed of movements, etc.). The generated player model(s) may be used to make a prediction as to whether or not a game will be successful. Success may be evaluated by a number of criteria such as retention of users in the number of games played per day, average session length, profitability, average expected lifetime value paid by a user, likelihood and/or frequency of a user making an in-game purchase, how likely a user is to engage a social network based on the game, etc. The player model may be used to provide quality assurance feedback to the developer. For example, each player model may be used to perform several thousand simulations of a video game or portion thereof.

Figure 5:
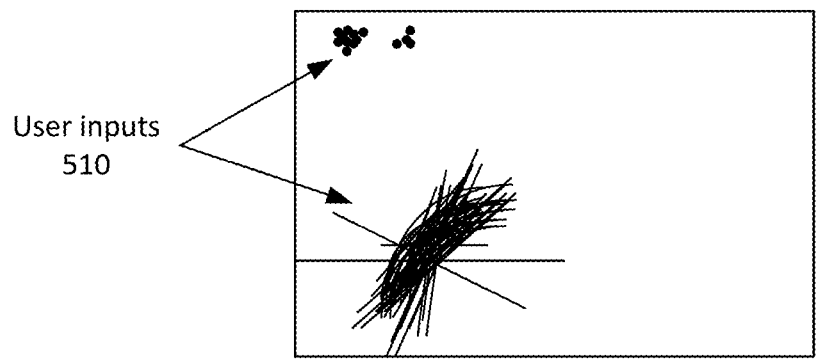
FIG. 5 is an example of user inputs and player model inputs for a particular video game as disclosed herein.
Figure 5:
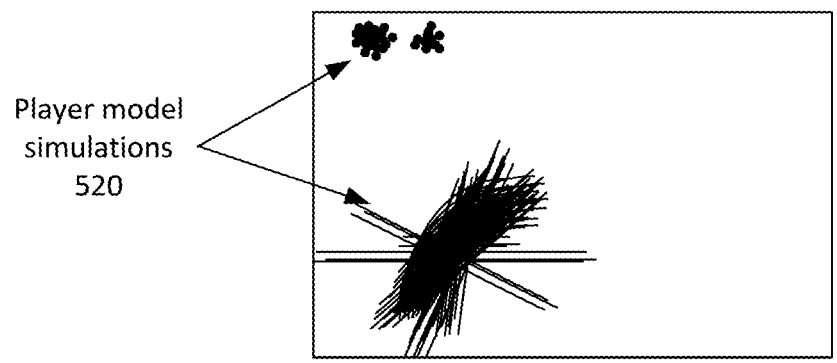

A video game may have multiple versions and users' actions on the prior versions of the game may be utilized as input to generate the player model. For example, a popular video game on mobile devices may involve using a slingshot to hurl an irate avian creature at some less-than-sturdy structures populated with dismayed swine. The majority of the touch input for such a game would be a user drawing the creature in the slingshot back at different angles and releasing the slingshot to hurl the creature toward the structure. The touch inputs may be analyzed and/or measured in terms of a success metric that indicates how many points a user ended up with at the end of a level or with a particular move, for example. A success metric may indicate, for example how user movements correlate with getting a high score in a level or a particular moment in a game, obtaining popular items in a game, etc. There may be other touch inputs that do not coincide with the slingshot (e.g., where a user selects an item, interacts with a menu, etc.). An example of user inputs 510 for such a game are shown in FIG. 5. The elements that were on the screen when a user took an action may be analyzed. For example, a swipe in a certain direction may be correlated with movement of a bird toward a pig. The player model 520 may perform thousands of simulations based on the user inputs. In effect, a number of games have this type of "fingerprint" for touch inputs. Selection of special items or making an in-game purchase may be correlated with retention (i.e., a user who makes a purchase plays the game longer). Thus, if a developer uploads a new version of the slingshot game, the player model(s) generated for the game may be capable of playing the game assuming the developer did not change the mechanism by which a user interacts with the game.

The player model may adapt to the information displayed on the screen. For example, it may know what power-ups are available to the user and be capable of using those power-ups in the game simulation. The player model may represent a user who can roughly play the game and a player model's behavior may change from simulation to simulation of the video game. For example, in one simulation, the player model may make a purchase of a power-up item while in a second simulation that player model may forego that purchase.

When a developer uploads a new version of a video game, a variety of information about the new version can be ascertained. For example, draw calls which instruct a process or graphics processor what to draw on a screen may be treated as a signal that is used in generating the player model. The draw calls for a game may be sent via an API, for example, to a server. The draw calls may be correlated with other signals obtained by the system. A prediction about the draw calls may be made in the event a developer uploads a new game version with draw calls that the developer has not made before. For example, if the new version's draw calls indicate that there are several rectangular shapes and text disposed therein, it may be inferred that the object (the rectangles and the associated text) are a component of the user interface. Thus, a developer may receive feedback from the player model simulations. For example, the simulations may show that many player models had difficulty selecting a particular button in the user interface. The developer would then be able to make the button larger.

After the simulations with the player models have been run, the developer may receive a performance indicator. The performance indicator, for example, may show screen shots of some of the simulation. For example, if a majority of the simulations terminated at the same spot or roughly same duration, the developer may be able to examine screenshots or video from just before the player model terminated the games. The screenshots may reveal that the player model in multiple simulations became trapped at a particular part of the game, indicating a bug. The screenshots may show a request for payment screen suggesting that users are unlikely to pay for more content. The performance indicator may show that in previous version of the game, the player model successfully completed a level on average one out of a hundred simulations. However, the new level the developer uploaded was completed half as frequently, suggesting that the new level is substantially more difficult than the past versions of the game. A performance indicator may be, for example, a number of games played per day, an average session length, a profitability indication, an error indication, and a social indication.

Figure 3:
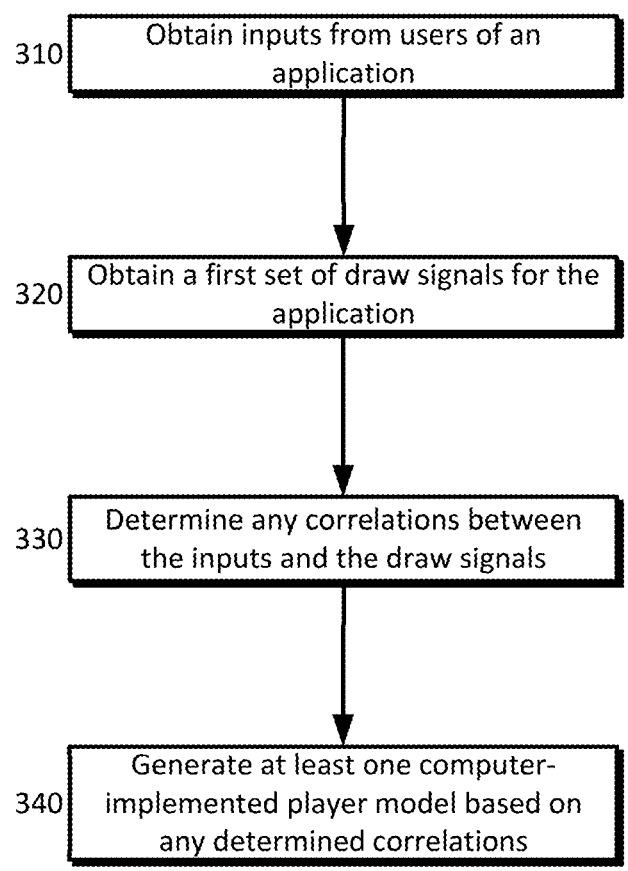
FIG. 3 is an example method for generating a player model based on at least one correlation between user inputs and draw signals as disclosed herein.

In an implementation, an example of which is provided in FIG. 3, one or more inputs may be obtained from one or more users of an application at 310. Input signals may include, for example, touch input, key strokes, actions a user takes, the time of day, other application notifications (e.g., was a user pulled out of a game for some other reason), location, movement, user in-game purchase frequency, amount of in-game expenditures, voice input, analog joystick input, wireless device (e.g., a wireless mouse and/or keyboard) input, etc. as described above. A first group of draw signals (i.e., draw calls or the actual screen output) for the application may be obtained at 320. Draw calls may be obtained, for example, when a developer uploads a new version of a game or from past versions of the game already uploaded. At least one correlation may be determined between at least a portion of the first group of draw signals for the application and at least a portion of the inputs from the one or more users of the application at 330. A machine learning technique may be applied, for example, to the inputs and draw signals to ascertain a relation between the two. A clustering algorithm may be applied to the correlations between the inputs and the draw signals. For example, expenditure of money may be correlated with draw calls that are associated with a payment screen. The correlated draw calls and user expenditure may be clustered based on the amount expended and another input feature (e.g., average session length). At least one computer implemented player model may be generated based on the correlations at 340. For example, in the slingshot example from earlier, user touch input that directs the slingshot to hurl the creature may be correlated with draw calls (e.g., the creature being drawn as it is tossed across a device's screen). Further the correlation may be made between the angle and speed at which the creature was hurled and a score or destruction of the structure. Thus, a player model may be constructed that can simulate a touch input hurling the creature at the structure at varying angles and velocities.

Figure 6:
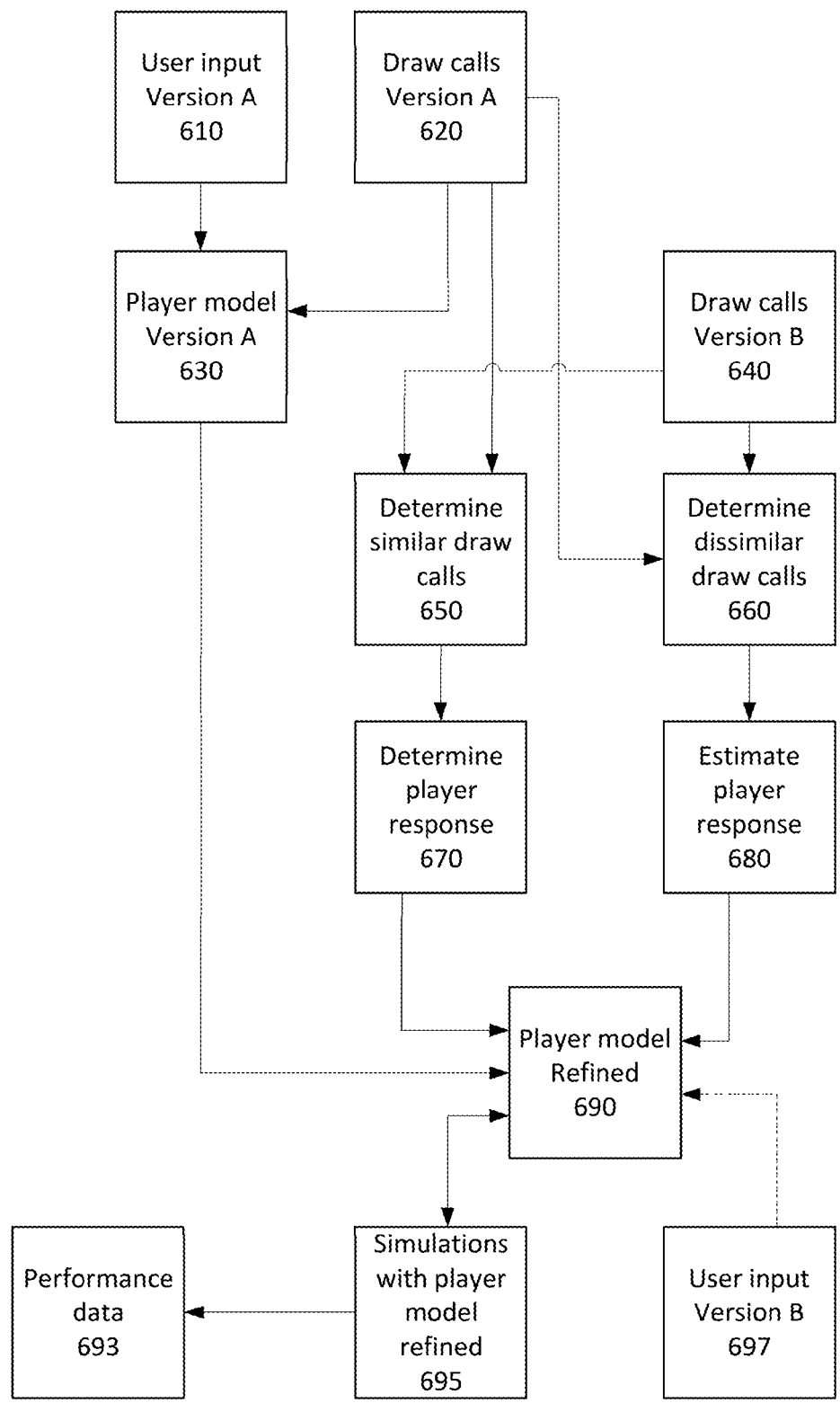
FIG. 6 shows an example process flow for refining a player model for a new version of an application as disclosed herein.

FIG. 6 shows an example process flow for refining a player model for a new version of an application. A player model 630 for a previous version of an application, version A, may be generated based on user input for version A 610 and draw calls 620 (i.e., draw signals) associated with the user inputs. A developer may upload a new version of the application, version B, to a server, for example. The draw calls (i.e., draw signals) for version B 640 may be compared to the draw calls for version A 620. The comparison of the draw calls will result in draw calls for version B 640 being determined as either similar to (i.e., resembling) 650 those of version A or being dissimilar 660 to the draw calls for version A 620. A resemblance or similarity may refer to identical draw signals. For example, the size and location of a box may be identical to that of a previous version. As another example, the menu may contain an additional menu item in a new version that was not present in the previous version of the menu. The additional item may be determined to be a part of the menu by virtue of its association with the previous version's menu. A similarity may be determined based on feature similarity. For example, in a previous version of a game, a menu may have been in the top left of a screen whereas the new version of the game may have the same menu but the menu may have differently-sized boxes defining submenus. In some configurations, a similarity may be determined based on the location of a draw call, the draw call itself (e.g., a shape geometry and size), the timing of the draw call (e.g., a draw call is made for specific duration, a draw call is made in response to a specific action for a specified period of time, a draw call is made during a specific part of a level, etc.), etc. For those draw calls of version B 640 that resemble (e.g., are identical to, or have similar temporal, location, and/or geometry parameters) those of the previous version 620 the player response may be determined to be similar to that of the previous version 670. That is, the player model for version A 630 may respond to the similar draw calls for version B 640 as it would for the draw calls of version A 620.

A player model response may be estimated 680 for draw signals from the version A 620 that do not resemble draw signals from version B 640, 660. Draw signals may be, for example associated with an object (e.g., a menu item, a game item, a pathway, a wall, etc.). If a device is instructed to draw a large box with several smaller boxes, each containing text, arrayed in a column inside the large box, the draw signals may indicate a menu even though the size and location of the large box differs from a menu the system had observed in the previous version of the game. Similarly, an obstacle may be determined based on the properties the obstacle presents. The system may determine that an objects draw calls indicate that it is an impassible and immovable wall.

Based on the player response determined and estimated for similar 650 and dissimilar 660 draw calls respectively and the player model for version A 630, the system may generate a refined player model 690. The refined player model 690 may simulate version B a desired number of instances. Thus, if the developer uploads a new user interface feature (e.g., a dialog box), a player model can predict how to respond to the new user interface feature (e.g., a dialog box) based on past draw signals. The player model model(s) may be modified based on the determination and estimation. Each simulation may generate performance data 693 indicating the likelihood of success for version B and/or quality of version B (e.g., software bugs). The system is dynamic and may update such inferences as user input data for version B 697 and simulation data 695 are returned. For example, it the system may determine that what it inferred as a wall is actually a curb based on user inputs 697. The user inputs 697 may have indicated character elevation changes upon stepping onto the curb and/or that users pressed a "jump" keystroke before characters began walking on the curb. Thus, the player model may be refined 690 as more data are obtained from simulations and as version B is played by actual users.

Figure 4:
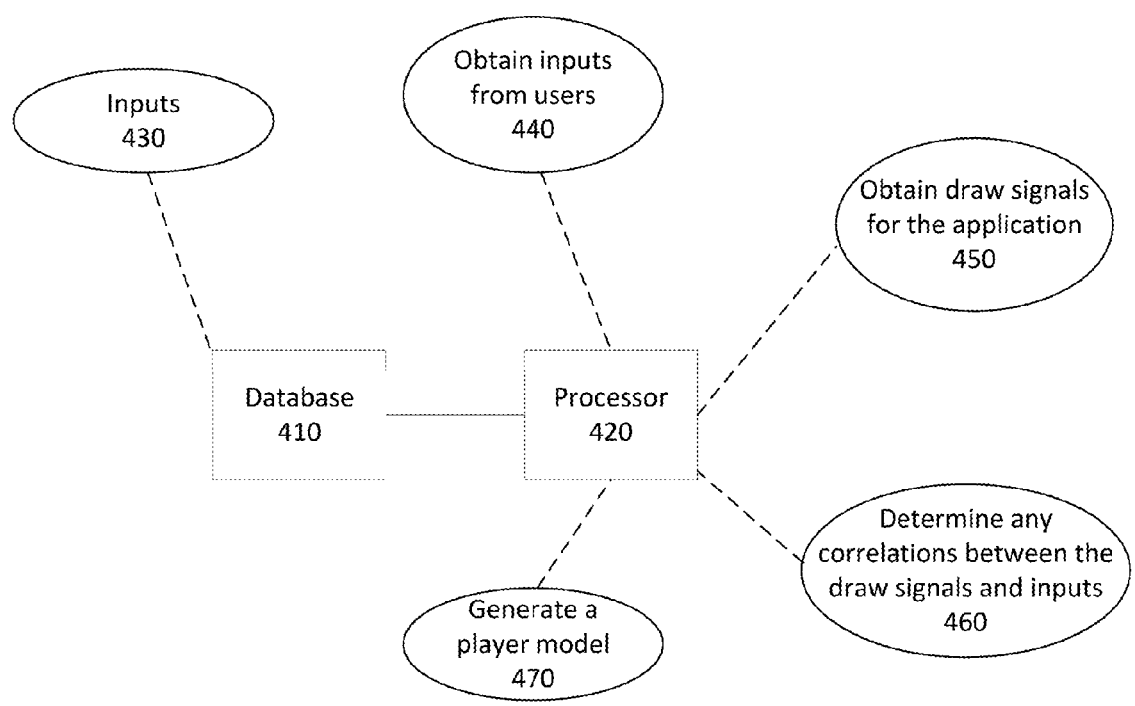
FIG. 4 is an example system for generating a player model according to an implementation.

In an implementation, an example of which is provided in FIG. 4, a system is provided that includes a database 410 and a processor 420 connected thereto. The database 410 may store one or more inputs 430 as described above. The inputs may be sent to the database 410 via an API on a user's device. With the user's permission, the API may transmit information about the user's interaction with the game to the database 410. Likewise, if the game is played on a server, the server may store the user's interactions with the game to the database 410. The processor 420 may be configured to obtain the inputs from users of an application 440. The processor 420 may obtain a first set of draw signals for the application 450 as described above. The processor 420 may determine correlations between at least a portion of the first set of draw signals for the application with at least a portion of the inputs from the users of the application 460. Based on the correlations, at least one computer-implemented player model may be generated 470.

Figure 1:
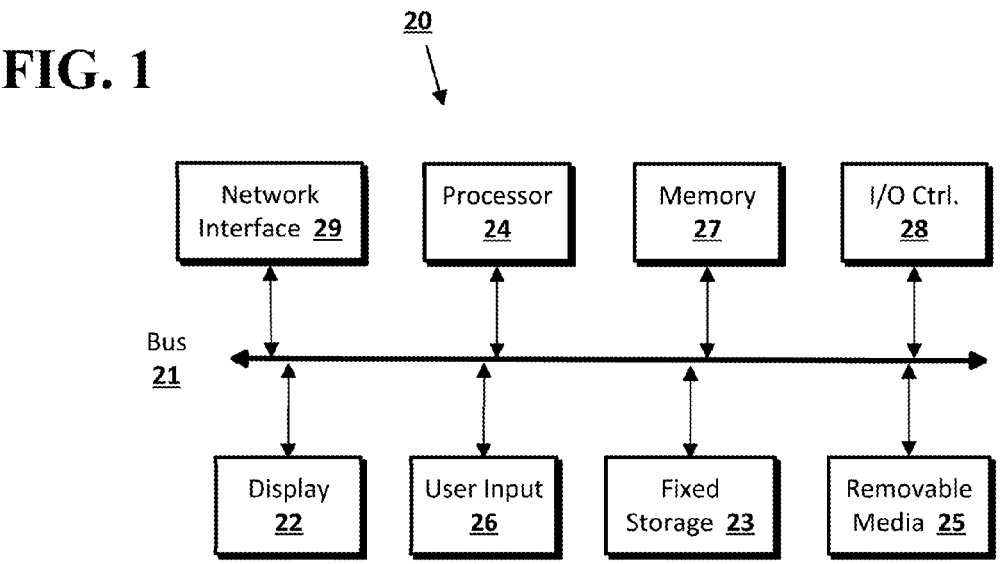
FIG. 1 shows a computer according to an implementation of the disclosed subject matter.

Implementations of the presently disclosed subject matter may be implemented in and used with a variety of component and network architectures. FIG. 1 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
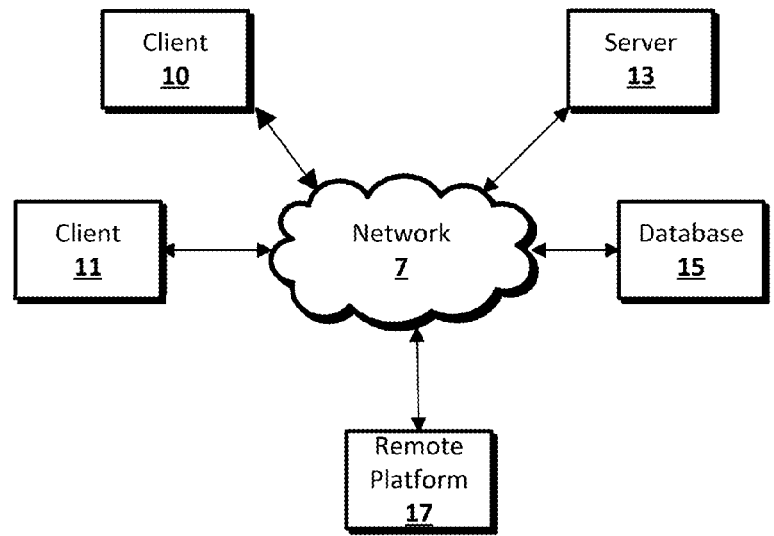
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

In situations in which the implementations of the disclosed subject matter collect personal information about users, or may make use of personal information, the users may be provided with an opportunity to control whether programs or features collect user information (e.g., a user's performance score, a user's work product, a user's provided input, a user's geographic location, and any other similar data associated with a user), or to control whether and/or how to receive instructional course content from the instructional course provider that may be more relevant to the user. In addition, certain data may be treated in one or more ways before it is stored or used, so that personally identifiable information is removed. For example, a user's identity may be treated so that no personally identifiable information can be determined for the user, or a user's geographic location associated with an instructional course may be generalized where location information is obtained (such as to a city, ZIP code, or state level), so that a particular location of a user cannot be determined. Thus, the user may have control over how information is collected about the user and used by an instructional course provider.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method, comprising:
   obtaining, by a processor, a plurality of input signals from a plurality of devices of a plurality of users of an application;
   obtaining, by the processor, a first plurality of draw signals for the application;
   determining, by the processor, correlations between at least a portion of the first plurality of draw signals for the application, and at least a portion of the input signals from the plurality of devices of the plurality of users of the application; and
   generating, by the processor, at least one computer-implemented player model based on the correlations, the at least one computer-implemented player model configured to produce performance indicators, from a plurality of simulations of operations of a first version of the application, to be used to develop a second version of the application.

2. The method of claim 1, wherein the plurality of input signals from the plurality of devices of the plurality of users of the application is selected from the group consisting of: a signal produced from a touch input, a signal produced from a voice input, a signal produced from a keystroke, a signal produced from an analog joystick input, and a signal produced from a wireless device input.

3. The method of claim 1, further comprising clustering, by the processor, the correlations, wherein the generating is based on a plurality of clusters.

4. The method of claim 1, further comprising:
   receiving, by the processor, a second plurality of draw signals for a third version of the application; and
   performing, by the processor, the plurality of simulations of the third version of the application using the at least one computer-implemented player model.

5. The method of claim 4, further comprising:
   comparing, by the processor, the first plurality of draw signals for the application to the second plurality of draw signals for the application;
   determining, by the processor, draw signals from the first plurality of draw signals that resemble draw signals from the second plurality of draw signals;
   estimating, by the processor, a response of the at least one computer-implemented player model to draw signals from the first plurality of draw signals that do not resemble draw signals from the second plurality of draw signals; and
   modifying, by the processor, the at least one computer-implemented player model based on a result of the determining the draw signals from the first plurality of draw signals that resemble the draw signals from the second plurality of draw signal and a result of the estimating the response of the at least one computer-implemented player model to the draw signals from the first plurality of draw signals that do not resemble the draw signals from the second plurality of draw signals.

6. The method of claim 4, further comprising providing, by the processor, a performance indicator for the third version of the application based on the plurality of simulations of the third version of the application.

7. The method of claim 6, wherein the performance indicator is selected from the group consisting of: a number of games played per day, an average session length, a profitability indication, an error indication, and a social indication.

8. The method of claim 4, further comprising providing, by the processor, at least one image from at least one of the plurality of simulations of the third version of the application.

9. The method of claim 1, wherein the generating the at least one computer-implemented player model is performed using a machine learning technique.

10. The method of claim 1, wherein the application is a video game application.

11. A system, comprising:
a database configured to store a plurality of input signals;
a processor connected to the database and configured to:
obtain the plurality of input signals from a plurality of devices of a plurality of users of an application;
obtain a first plurality of draw signals for the application;
determine correlations between at least a portion of the first plurality of draw signals for the application, and at least a portion of the input signals from the plurality of devices of the plurality of users of the application; and
generate at least one computer-implemented player model based on the correlations, the at least one computer-implemented player model configured to produce performance indicators, from a plurality of simulations of operations of a first version of the application, to be used to develop a second version of the application.

12. The system of claim 11, wherein the plurality of input signals from the plurality of devices of the plurality of users of the application is selected from the group consisting of: a signal produced from a touch input, a signal produced from a voice input, a signal produced from a keystroke, a signal produced from an analog joystick input, and a signal produced from a wireless device input.

13. The system of claim 11, the processor further configured to cluster the correlations, wherein the processor is configured to generate the at least one computer-implemented player model based on a plurality of clusters.

14. The system of claim 11, the processor further configured to:
receive a second plurality of draw signals for a third version of the application; and
perform a plurality of simulations of the third version of the application using the at least one computer-implemented player model.

15. The system of claim 14, the processor further configured to:
compare the first plurality of draw signals for the application to the second plurality of draw signals for the application;
determine draw signals from the first plurality of draw signals that resemble draw signals from the second plurality of draw signals;
estimate a response of the at least one computer-implemented player model to draw signals from the first plurality of draw signals that do not resemble draw signals from the second plurality of draw signals; and
modify the at least one computer-implemented player model based on a result of a determination of the draw signals from the first plurality of draw signals that resemble the draw signals from the second plurality of draw signals and a result of an estimation of the response of the at least one computer-implemented player model to the draw signals from the first plurality of draw signals that do not resemble the draw signals from the second plurality of draw signals.

16. The system of claim 14, the processor further configured to provide a performance indicator for the third version of the application based on the plurality of simulations of the third version of the application.

17. The system of claim 16, wherein the performance indicator is selected from the group consisting of: a number of games played per day, an average session length, a profitability indication, an error indication, and a social indication.

18. The system of claim 14, the processor further configured to provide at least one image from at least one of the plurality of simulations of the third version of the application.

19. The system of claim 11, wherein the processor is configured to generate the at least one computer-implemented player model by using a machine learning technique.

20. The system of claim 11, wherein the application is a video game application.

* * * * *